United States Patent Office 3,284,634
Patented Nov. 8, 1966

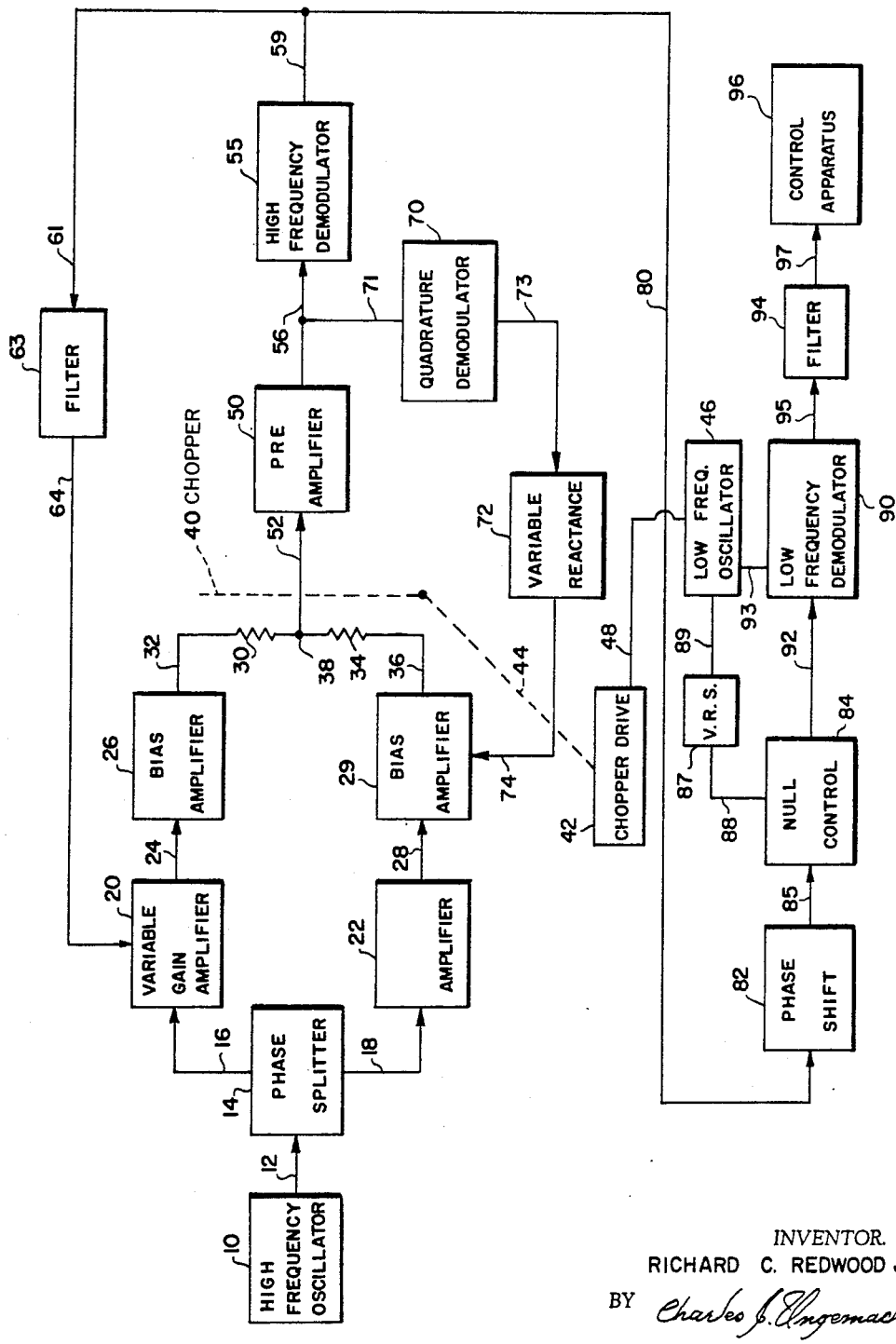

3,284,634
APPARATUS FOR POSITIONING A BODY RELATIVE TO A RADIANT ENERGY SOURCE
Richard C. Redwood, Jr., Los Angeles, Calif., assignor to Honeywell Inc., a corporation of Delaware
Filed Dec. 28, 1962, Ser. No. 248,039
11 Claims. (Cl. 250—214)

This invention relates to control apparatus and more particularly to apparatus for controlling the position of a body with respect to a source of radiant energy. In recent years it has become important to be able to position a satellite or missile with respect to a source of radiant energy such as the earth or other planetary body so that the satellite may determine the local vertical and maintain a predetermined position with respect thereto. In a copending application Serial No. 101,238, filed April 6, 1961, of Joseph E. Killpatrick, now Patent No. 3,204,191 a horizon sensor is shown operable to receive the radiation from the earth and impose this radiation on a set of thermistor bolometers which are sensitive to the radiation received to produce outputs accordingly. The resistances of the thermistor bolometers change with the amount of radiation received and by a suitable bridge arrangement in which the thermistors are located a balance may be maintained so that the local vertical becomes known. Apparatus such as reaction jets may be controlled by the output from the bridge arrangement to position the satellite with respect to the local vertical.

In devising a bridge circuit for use with the thermistor bolometers a number of problems have been encountered in the past. For example a very small change in one thermistor resistance with respect to another causes a very large signal which is likely to saturate any preamplifier connected to the bridge, if alternating current is used to supply the bridge. The above-referenced Killpatrick application shows a bridge utilizing two direct current sources and chopping the energy received by the thermistor bolometers so as to superimpose this resistance change upon the D.C. bias. Utilizing a D.C. bias system has a number of problems including insensitivity of the system due to noise. In a D.C. system the preamplifier must amplify low frequency signals centered around the chopping frequencies and this usually leads to severe noise problems in transistor type amplifiers. This transistor noise could be overcome by going to higher chopping frequencies where transistor noise is low: however, thermistors designed for high chopping frequencies have lower responsivity than those designed for low chopping frequencies. It would be desirable to have a system wherein low chopping frequencies are utilized yet where high frequency amplification may be employed to give low noise.

The present invention overcomes the problems in the prior art and provides a system utilizing high amplification frequency while utilizing low chopping rate. The resulting system optimizes the signal to noise ratio giving a high sensitivity system by utilizing an alternating current type bridge arrangement wherein the thermistor bolometers are supplied with a high frequency carrier signal and receive radiation which is chopped at a low frequency so as to provide a subcarrier thereupon.

The present invention also provides a means of keeping the high frequency bias voltage applied to each bolometer in the correct ratio with respect to the bias of the opposite bolometer. For example if the bias voltages supplied to the thermistor were to change in amplitude because of parameter shifts in some of the components a large signal might be presented at the bridge output which would render the amplification system saturated and insensitive to radiation signals. Likewise a phase shift somewhere in the bias system would cause an output from the bridge which also might render the system insensitive by saturation. The present invention overcomes these problems by utilizing a variable gain amplifier and a variable reactance to supply the A.C. bias to the bridge so that any changes in gain within the system produce a correcting signal operable to vary the variable gain amplifier and thereby adjust the bridge to a balance condition and any changes in phase which occur operate to adjust the variable reactance in the circuit to correct the phase and thereby balance the bridge arrangement. By this means the bridge is always maintained in a null condition with respect to the applied high frequency carrier signal both as to magnitude and phase, thereby preventing saturation of the amplification system. Bridge outputs to the control apparatus are due solely to changes in radiation and not to changes in circuit components.

A more complete understanding of the present invention will be obtained upon a reading of the following specification and claims when taken in conjunction with the figure which shows a block diagram of the circuitry of the present invention.

Referring to the figure, a high frequency oscillator 10 is shown which may be supplied from a source of power (not shown) to produce a high frequency output on a connection 12. The high frequency oscillator in the preferred embodiment may produce an output oscillating at five kilocycles for example but great variation of this frequency may be made depending on the desired characteristics of the system. A signal from the high frequency oscillator is presented to a phase splitting device 14 which operates to produce two output signals on connections 16 and 18. The output signals on connections 16 and 18 are preferably adjusted to be of substantially equal magnitude but of opposite phase. The signal on connection 16 is presented to a variable gain amplifier 20 while the signal on connection 18 is presented to an amplifier 22. Preferably amplifiers 20 and 22 will have the same characteristics so that their outputs are again substantially equal but of opposite phase. The output of the variable gain amplifier 20 is presented by a connection 24 to a bias amplifier 26 whie the output of amplifier 22 is presented by a connection 28 to a bias amplifier 29. Again bias amplifiers 26 and 29 preferably have the same characteristics so that their outputs are substantially equal but of opposite phase. The output of bias amplifier 26 is connected to a resistor 30 by a connection 32. The output of bias amplifier 29 is presented to a resistor 34 by a connection 36. Resistors 30 and 34 are also connected to a common junction 38. Resistors 30 and 34 are radiation sensitive resistors such as a thermistor bolometer and their resistance changes with the amount of radiation received thereby. These resistors are preferably matched so that their characteristics are substantially the same and their resistances will change equally with equal amounts of radiation.

It should be understood at this point that the preferred embodiments although requiring that the characteristics of amplifiers 20 and 22 be the same and those of the bias amplifiers 26 and 29 be the same, these are matters of design choice. Unmatched amplifiers may be used as long as the voltage at junction 38 is substantially zero under nominal conditions of temperature, supply voltage, etc. If the gain and the phase shifts of the various amplifiers are chosen exactly equal and the resistor 30 has identical characteristics with resistor 34, then it is seen that junction 38 has a zero voltage as long as the radiation received by resistor 30 is the same as that received resistor 34. In initially setting up this circuit it is necessary to adjust the unbalanced voltages of the two bias circuits so that the unbalance due to all causes is within the correction range of the variable gain amplifier and of the variable reactance. This may be accomplished by adjusting the gain of amplifier 22 for example and adjusting the phase shift of the amplifier 26 for example so that the signals across resistors 30 and 34 are in fact equal and opposite to the extent necessary and junction 38 is in fact at a low potential which does not produce saturation of the preamplifier.

Having adjusted the above described circuitry until junction 38 has substantially zero voltage thereon when resistors 30 and 34 are subjected to the same radiation, it is seen that a change in resistance of resistor 30 with respect to resistor 34 produces a signal at junction 38. It is also seen however that should the components in the above described circuitry shift during use so that for example the voltage supplied by the combination of amplifiers 20 and 26 is greater than that supplied by amplifiers 22 and 29, junction 38 also has an output signal even though the radiation received by resistors 30 and 34 has not changed. Likewise should a drift in components be such that a phase shift results in one leg of the bridge circuit with respect to the other, junction point 38 provides an output signal even though the radiation has not changed on resistors 30 and 34. In addition, the radiation received by resistors 30 and 34 is caused to pulsate by a chopper shown generally as a dash line 40. Chopper 40 may be a mechanical screen connected to a chopper driver 42 by a connection shown as a dashed line 44. Chopper driver 42 may be a coil energized by signals from a low frequency oscillator 46 by means of a conductor 48. Chopper 40 operates to interrupt the radiation received by resistors 30 and 34 at a relatively low frequency. In the preferred embodiments a 16 cycles per second frequency may be utilized although it should be realized that great variation in this low frequency chopping signal may be employed depending upon the desired characteristics of the system.

It is now seen that the voltage at junction 38 may consist of two components, a first being the high frequency carrier component from oscillator 10 which supplies the resistors 30 and 34 and the second being sidebands corresponding to the low frequency modulating signal superimposed thereon. Should the radiation received by one of the resistors 30 or 34 change, the sideband components on the output junction 38 will change correspondingly. The sidebands corresponding to the low frequency signals are the signals from which the device outputs are derived; these derived outputs may be used to control a satellite and bring it into the desired orientation with respect to the radiating body such as the earth. The modulated high frequency signal has a zero amplitude carrier level when the high frequency voltages supplied to resistors 30 and 34 are equal and of opposite phase. Should the gain of one of the amplifiers change or some other component within the circuit drift so as to supply resistor 30 with a different voltage than that supplied to resistor 34, an output will also appear on junction 38 but this signal will be a constant high frequency signal, and forms a carrier for the modulated wave. The carrier component when demodulated produces an output D.C. voltage. In other words if the voltage on junction 38 is occasioned by both a change in resistance due to a change in incoming radiation, and a change in gain of one of the amplifiers, this signal when demodulated consists of a D.C. component and a low frequency A.C. component. The unbalance in radiation falling on resistors 30 and 43 is indicated by the amplitude and phase of the low frequency A.C. component. The circuitry to be described below utilizes the D.C. component to change the gain of the variable gain amplifier 20 in such a direction as to rebalance the bridge arrangement as far as the high frequency signal is concerned.

Junction 38 is connected to a preamplifier 50 by a connection 52. The output of preamplifier 50 is fed to a high frequency demodulator 55 by a connection 56. The high frequency demodulator produces an output on connection 59 which is presented by a connection 61 to a filter 63. Filter 63 is so chosen as to only allow the D.C. component of the demodulated signal to be presented to the variable gain amplifier 20 by a connection 64. The D.C. component on junction 59 is a measure of the high frequency carrier level which is produced by unbalance in the two halves of the bias supply. The D.C. level at the output of demodulator 55 is presented to the variable gain amplifier 20 and operates to adjust the gain of amplifier 20 in such a direction as to bring the bias bridge back into balance for the high frequency signal. Thus the circuit is maintained sufficiently in balance at all times with respect to the high frequency signal to prevent preamplifier saturation and allowing any change in radiation received by the resistors to produce an output in the form of a low frequency A.C. component which may be utilized in the control system to reorient the satellite in the desired direction.

It was also previously mentioned that a change in phase in some component of the bridge circuit will produce an undesirable output. The present invention compensates for any change in phase by presenting the signal from junction 38 through preamplifier 50 to a quadrature demodulator 70 by means of a connection 71 which is connected to the output of preamplifier 50. Any quadrature component which exists at the output of preamplifier 50 causes a signal at the output of the quadrature demodulator 70 to be presented to a variable reactance 72 by means of a connection 73. Variable reactance 72 is utilized in conjunction with the bias amplifier 29 by means of a connection 74 to adjust the phase shift through the bias amplifier 29 and to bring the bridge back into balance with regards to phase. More specifically, should the phase of the signal presented across resistor 30 not be exactly 180° out of phase with respect to that across resistor 34, a quadrature component will exist which is presented to the quadrature demodulator 70. Quadrature demodulator 70 thereupon varies the reactance associated with the bias amplifier 29 to adjust the phase of the signal across resistor 34 in such a direction that it is again 180° out of phase with the signal across resistor 30. By this means the bridge is always maintained in balance with regard to phase.

The output on connection 59 is presented by means of a connection 80 to a network utilized in controlling the orientation of the satellite. As stated, any change in radiation received by resistors 30 or 34 brings about a signal at junction 38 which appears on connection 59 as a low frequency signal because of the chopper. This signal is presented by the connection 80 to a phase shift network 82. The purpose of the phase shift network is to compensate for the lag occasioned by the chopper 40 which causes the radiation received by resistors 30 and 34 to be modulated at the low frequency. If a mechanical chopper is used the electrical signal supplying the chopper is somewhat out of phase with the mechanical motion of the chopper due to the inherent lag of the mechanical system. Since the desired output signal for the system is a D.C. voltage, the signal on conductor 59 must be further demodulated before used in the control system. The demodulator for the low frequency signal utilizes the electrical signal driving the chopper as a reference and hence phase shift network 82 is utilized to change the phase of the chopped signal on connection 59 so as to be compatible with the electrical signal driving chopper 40. The signal from phase shift device 82 is presented to a null control circuit 84 by a connection 85. The null control circuit also has an input from a variable reference source of voltage 87 on a connection 88. Variable reference source 87 is shown connected to the low frequency oscillator 46 by a connection 89 and supplies power at the frequency of the chopper 40. The purpose of the null control circuit is to add a voltage from reference source 87 with the voltage from the phase shift device 82 to compensate for any mechanical misalignment of the bolometers. For example, with the satellite in a desired condition no low frequency voltage should exist on connection 59 but because of the slight mechanical misalignment of the optical system and because of mismatching of the resistors 30 and 34, some inherent voltage may exist.

Variable source 87 may then be adjusted so that the output from the null control circuit 84 is zero when the horizon boresight condition exists. The null control circuit 84 may comprise merely a summing network. The output from the null control circuit is thus indicative of any misorientation of the satellite with respect to the earth and the signal therefrom is fed to a low frequency demodulator 90 by means of a connection 92. Demodulator 90 is also connected to the low frequency oscillator 46 by a connection 93 to obtain a reference signal at the chopping frequency therefrom. The output of demodulator 90 is connected to a filter 94 by means of a connection 95 so as to smooth out any alternating components remaining in the signal. A D.C. output results which is fed to the control apparatus 96 by means of a connection 97. Control apparatus 96 may comprise the reaction jet system for the satellite and a signal on conductor 97 will cause the firing of one or more of the jets in this reaction control system to bring about reorientation of the satellite with respect to the local vertical. The polarity of the D.C. signal on connection 97 is dependent upon which of the resistors 30, or 34, receives the most radiation. As explained in the above-mentioned Killpatrick application, a misorientation of the satellite with respect to the earth will expose one of the thermistors to more radiation while exposing the opposite thermistor to less. Thus if the satellite were to swing in one direction away from the local vertical, resistor 30 might be receiving more radiation than resistor 34, while if it were to swing in the opposite direction about the local vertical, resistor 34 would receive more radiation than resistor 30. Depending upon which of the resistors receives the most radiation, the signal on conductor 52 is of a first or an opposite phase and the output from the demodulator 55 is a pulsating signal of a first or opposite phase. Thus when the signal is passed through the demodulator 90 and the filter 94, it is a D.C. signal of a first or opposite sense or polarity and depending upon the polarity the correct reaction jet in the control apparatus 96 will be fired. This causes the satellite to return to the local vertical position as is desired.

As explained in the Killpatrick application, four thermistor bolometers are normally utilized to control the apparatus about the local vertical. Resistors 30 and 34 in the present invention may comprise two oppositely spaced thermistor bolometers so that the output resulting is indicative of orientation of the satellite in one axis. Identical apparatus to that described above may be employed to control the satellite's orientation about the opposite axis and thus for example the above described apparatus would give outputs indicative of pitch errors while identical bridge circuitry to the above described would be utilized to give outputs indicative of roll errors.

In describing the above apparatus, blocks have been used which comprise standard components normally found in the art. The high frequency oscillator 10 may be any common high frequency oscillator and the phase splitter 14 may be any well-known phase splitting device such as transformer 32 of Goodman et al., 3,066,570. The variable gain amplifier 20 may be the same as that shown in my copending application Serial No. 232,749, filed October 24, 1962, now Patent No. 3,234,843. The bias amplifiers 26 and 29 and amplifier 22 as well as preamplifier 50 may be of any standard design and the demodulators 55, 70 and 90 may be standard demodulators. Quadrature demodulator 70 differs from the demodulator 55 only in the phase of its reference signal: as is well known in the art, and taught on page 188 of "Electronics" for February 1954, the reference signal of a demodulator is made of the same frequency and phase as the signal to be detected, and since here a quadrature signal is to be detected, the reference signal for demodulator 70 is in quadrature with reference signal for demodulator 55, and of the same 5 kilocycle frequency. The variable reactance 72 may be an electronic variable reactance well-known in the art. As previously stated, the null control circuit may be a standard summing network, as shown in FIGURE 3.1, page 33, volume 21, of the Radiation Laboratory Series published in 1948 by McGraw-Hill Company Incorporated, and the various filters shown herein may be of any standard variety.

It should also be realized that the various components described in the preferred embodiment above may be relocated in the circuit and still perform the same function. For example the null control circuit 84 may be placed after the demodulator 90 or in fact in the output after the filter 94. Also the positions of the variable gain amplifier and the bias amplifiers may be interchanged and the variable reactance may be associated with amplifier 26 or with amplifiers 20 and 22 rather than with bias amplifier 29. The various components above have been drawn for simplicity and the power inputs to these components have not been shown. The arrows shown joining the various components may consist of a number of wires and not just a single wire and the references to ground potential have not been shown for simplicity. These showings are common in the art and well within the skill of anyone versed in this art to supply. Likewise the reference voltages for the various demodulators have not been shown since to do so would unnecessarily encumber the drawing.

Having described my invention in its preferred embodiment, it will be realized that many alterations and variations may be made within the skill of one in the art. I do not intend to be limited by the above-preferred embodiment but intend only to be limited by the following claims.

I claim:
1. Apparatus of the class described comprising, in combination: first and second impedances connected in series to form a common junction; signal source means having an output of variable magnitude and phase; means connecting said signal source means to said first and second impedances so that signals of a first and an opposite phase are presented across said first and second impedances respectively, the signal at the common junction normally being substantially zero; first means in circuit with the common junction responsive to signals of the first and opposite phase and operable to vary the magnitude of the output from said signal source means; and second means in circuit with the common junction responsve to signals of phase quadrature with respect to the first and opposite phase and operable to vary the phase of the output from said signal source means, said first and second means maintaining the signal at the common junction normally at substantially zero.

2. Apparatus of the class described comprising, in combination: variable gain means having an input in circuit with a source of signal of a first frequency and of a first phase; variable phase means having an input in circuit with a source of signal of the first frequency and of phase opposite the first phase; first and second impedances connected in series to form a junction; means connecting said variable gain means and said variable phase means to said first and second impedances to supply signals of the first frequency and of normally opposite phase to said first and second impedances respectively so that the junction of said first and second impedances normally has a substantially zero signal of the first frequency thereon; and means connected to the junction of said first and second impedances responsive to signals thereon to vary the gain of said variable gains means and to vary the phase of said variable phase means so that the signals of the first frequency across said first and second impedances are maintained substantially opposite in phase and of such magnitude that the signal on the junction of said first and second impedances is maintained at substantially zero.

3. Apparatus of the class described comprising, in combination: a first impedance having first and second end terminals; a second impedance having first and second end terminals; means connecting the first end terminals of said first and second impedances to form a common junction; a source of alternating signal of a predetermined frequency; variable gain and phase means connected to said source of alternating signal and to the second end terminals of said first and second impedances to supply signals across said first and second impedances of normally opposite phase so that no signal of the predetermined frequency normally appears at the common junction; means connected to the common junction responsive to signals of a first phase and of the predetermined frequency and operable to vary the gain of said variable gain and phase means to reduce any signal of the predetermined frequency and of the first phase on the common junction to a null value; and means connected to the common junction responsive to signals of phase quadrature with respect to the first phase and of the predetermined frequency and operable to vary the phase of said variable gain and phase means to reduce any signal of the predetermined frequency and of the quadrature phase on the common junction to a null value.

4. Apparatus of the class described comprising, in combination: a first amplifier having an output of a first frequency and of variable magnitude; a second amplifier having an output of the first frequency and of variable phase; first and second condition sensitive resistances exposed to a source of radiation which is caused to pulsate at a second frequency; circuit means connecting said first and said second amplifiers to said first and second radiation sensitive resistances to produce a signal having a first portion variable at the first frequency and a second portion modulating the first portion at the second frequency; means connected to said circuit means to receive the signal and operable upon variation of the magnitude of the first portion of the signal to adjust the magnitude of the output of the first amplifier; means connected to said circuit means to receive the signal and operable upon variation of the phase of the first portion to adjust the phase of the output of the second amplifier; and output means connected to said circuit means to receive the signal and operable in accordance with the second portion of the signal to produce a further output indicative of the condition.

5. Apparatus of the class described comprising, in combination: first and second radiation sensitive resistors connected in series to form a common junction; means mounting said first and second resistors to receive radiation; means periodically interrupting the radiation received by said first and second resistors at a first frequency; a source of second frequency alternating signal; phase splitting means having an input connected to said source of second frequency signal and having first and second outputs, the signals on the first and second outputs being of the second frequency and of opposite phase; variable gain means; variable phase means; means connecting said variable gain means and said variable phase means to the first and second outputs of said phase splitting means and to said first and second resistors so as to supply said first and second resistors with signals of the second frequency but of opposite phase; first demodulator means in circuit with the common junction responsive to signals of the second frequency and of the first and opposite phase and operable to vary the gain of said variable gain means; second demodulator means in circuit with the common junction responsive to signals of the second frequency and of phase in quadrature with the first and opposite phase and operable to vary the phase of said variable phase means; and means connected to the common junction responsive to modulation signals of the first frequency on the second frequency and operable to provide an output indicative of the radiation received by said first and second resistors.

6. In combination:
radiation sensing means, including a pair of nominally identical electrically energizable members, characterized by giving an output which is zero when said members are energized with equal and opposite electric input signals, and which departs from zero when said input signals are not equal and opposite;
adjustable means for supplying to said radiation sensing means alternating electric signals of a selected frequency and of nominally equal amplitude and opposite phase;
phase sensitive demodulator means connected to receive said output for giving control signals representative of the in-phase and quadrature components of said output at said selected frequency; and
means connected to receive said control signals and said output for adjusting said adjustable means to vary the phase and amplitude of said input signals so as to make them equal and opposite.

7. In combination:
radiation sensing means including a pair of nominally identical electrically energized members, characterized by giving an output which is zero when said members are equally irradiated and are energized with equal and opposite electric input signals, and which departs from zero when said members become unequally irradiated, and when said input signals are not equal and opposite;
adjustable means for supplying to said radiation sensing means alternating electric signals of a first frequency and of nominally equal amplitude and opposite phase;
phase sensitive demodulator means connected to receive said output for giving control signals representative of the in-phase and quadrature components of said output at said selected frequency;
means connected to receive said control signals for adjusting said adjustable means to vary the phase of said input signals so as to make them opposite;
means modulating the radiation reaching said sensing means at a second frequency;
second modulator means connected to receive the control signal representative of said in-phase component, for giving a further signal representative in sense and magnitude of the inequality in the radiation of said members; and
utilization means connected to said second demodulator means for actuation in accordance with said further signal.

8. In combination:
condition responsive means, including a pair of electrically energizable members, characterized by giving an output which is zero when said members are energized with equal and opposite electric input signals, and which departs from zero when said input signals are not equal and opposite;
adjustable means for supplying to said condition responsive means alternating electrical signals of a selected frequency and of nominally equal amplitude and opposite phase;
phase sensitive demodulator means connected to receive said output for giving control signals representative of the in-phase and quadrature components of said output at said selected frequency; and
means connected to receive said control signals and said output for adjusting said adjustable means to vary the phase and amplitude of said input signals so as to make them equal and opposite.

9. In combination:
condition responsive means including a pair of electrically energized members, characterized by giving an output which is zero when said condition has a predetermined value and said members are energized with equal and opposite electric input signals, and which departs from zero said condition departs from said value and when said input signals are not equal and opposite;

adjustable means for supplying to said condition responsive means alternating electric signals of a first frequency and of nominally equal amplitude and opposite phase;

phase sensitive demodulator means connected to receive said output for giving control signals representative of the in-phase and quadrature components of said output at said first frequency;

means connected to receive said control signals for adjusting said adjustable means to vary the phase of said input signals so as to make them opposite;

means modulating the operation of said condition representative means at a second frequency;

second demodulator means connected to receive the control signal representative of said in-phase component, for giving a further signal representative in sense and magnitude of the deviation of said condition from said predetermined value; and condition controlling means connected to said second demodulator means for actuation in accordance with said further signal.

10. In combination:

a bolometer, including a pair of radiation responsive electrically energizable resistors, characterized by giving an output which is zero when said resistors are energized with equal and opposite electric input signals, and which departs from zero when said input signals are not equal and opposite;

adjustable means for supplying to said bolometer alternating electric signals of a selected frequency and of nominally equal amplitude and opposite phase;

phase sensitive demodulator means connected to receive said output for giving control signals representative of the in-phase and quadrature components of said output at said selected frequency; and means connected to receive said control signals and said output for adjusting said adjustable means to vary the phase and amplitude of said input signals so as to make them equal and opposite.

11. In combination:

a bolometer, including a pair of radiation responsive electrically energizable resistors, characterized by giving an output when said resistors are equally irradiated and are energized with equal and opposite input signals, and which departs from zero when said resistors become unequally irradiated and when said input signals are not equal and opposite;

adjustable means for supplying to said bolometer alternating electric signals of a first frequency and of nominally equal amplitude and opposite phase;

phase sensitive demodulator means connected to receive said output for giving control signals representative of the in-phase and quadrature components of said output at said first frequency;

means connected to receive said control signals for adjusting said adjustable means to vary the phase of said input signals so as to make them opposite;

means modulating the radiation reaching said bolometer at a second frequency;

second demodulator means connected to receive the control signal representative of said in-phase component, for giving a further signal representative in sense and magnitude of the inequality in the irradiation of said resistors; and utilization means connected to second demodulator means for actuation in accordance with said further signal.

References Cited by the Examiner
UNITED STATES PATENTS

| | | | |
|---|---|---|---|
| 2,153,738 | 4/1939 | Braden | 330— 144 X |
| 2,692,358 | 10/1954 | Wild | 330—144 X |
| 2,868,995 | 1/1959 | Kelsey et al. | 250—210 |
| 2,982,911 | 5/1961 | Fluegel et al. | 219—20 X |
| 3,007,053 | 10/1961 | Merlen | 250—203 |
| 3,042,875 | 7/1962 | Higginbotham | 330—124 X |
| 3,066,570 | 12/1962 | Goodman et al. | 250—214 X |
| 3,081,399 | 3/1963 | Schwarz | 250—83.3 X |

RALPH G. NILSON, *Primary Examiner.*

WALTER STOLWEIN, *Examiner.*